(12) United States Patent
Edwards et al.

(10) Patent No.: US 6,860,649 B2
(45) Date of Patent: Mar. 1, 2005

(54) TRANSCEIVER FOR LC CONNECTOR

(76) Inventors: Philip J. Edwards, 6721 Positano La., San Jose, CA (US) 95138; Bradley S. Levin, 37073 Magnolia St., #205, Newark, CA (US) 94560; Michael M. O'Toole, 5913 Foligno Way, San Jose, CA (US) 95136; Joseph L. Vandenberg, 415 N. Lark Ellen Ave., West Covina, CA (US) 91791; Lee L. Xu, 21124 Greenleaf Dr., Cupertino, CA (US) 95014

( * ) Notice: Subject to any disclaimer, the term of this patent is extended or adjusted under 35 U.S.C. 154(b) by 44 days.

(21) Appl. No.: 10/034,792

(22) Filed: Dec. 27, 2001

(65) Prior Publication Data

US 2003/0103740 A1 Jun. 5, 2003

Related U.S. Application Data

(60) Provisional application No. 60/259,141, filed on Dec. 27, 2000.

(51) Int. Cl.[7] .................................................. G02B 6/42
(52) U.S. Cl. ......................................................... 385/92
(58) Field of Search ...................................... 385/88–94

(56) References Cited

U.S. PATENT DOCUMENTS

| | | | | |
|---|---|---|---|---|
| 4,389,655 A | | 6/1983 | Baues | 346/107 |
| 5,367,530 A | * | 11/1994 | Noishiki et al. | 372/43 |
| 5,708,743 A | * | 1/1998 | DeAndrea et al. | 385/88 |
| 5,901,262 A | | 5/1999 | Kobayashi et al. | 385/89 |

FOREIGN PATENT DOCUMENTS

EP          0 901 023 A2     3/1999     ............ G02B/6/12

* cited by examiner

*Primary Examiner*—Akm Enayet Ullah
*Assistant Examiner*—Jerry T Rahll

(57) ABSTRACT

A testable optical subassembly comprising a unitary structure of an optically-clear moldable material having at least the following features: (a) an optical path for transmitting optical signals between a fiber and an optoelectric device (OED); (b) a ferrule-receiving bore for receiving a ferrule and aligning a fiber held therein to the optical path; and (c) an OED-receiving cavity for receiving a lead frame and aligning an OED mounted thereon to the optical path along one or more axes.

16 Claims, 5 Drawing Sheets

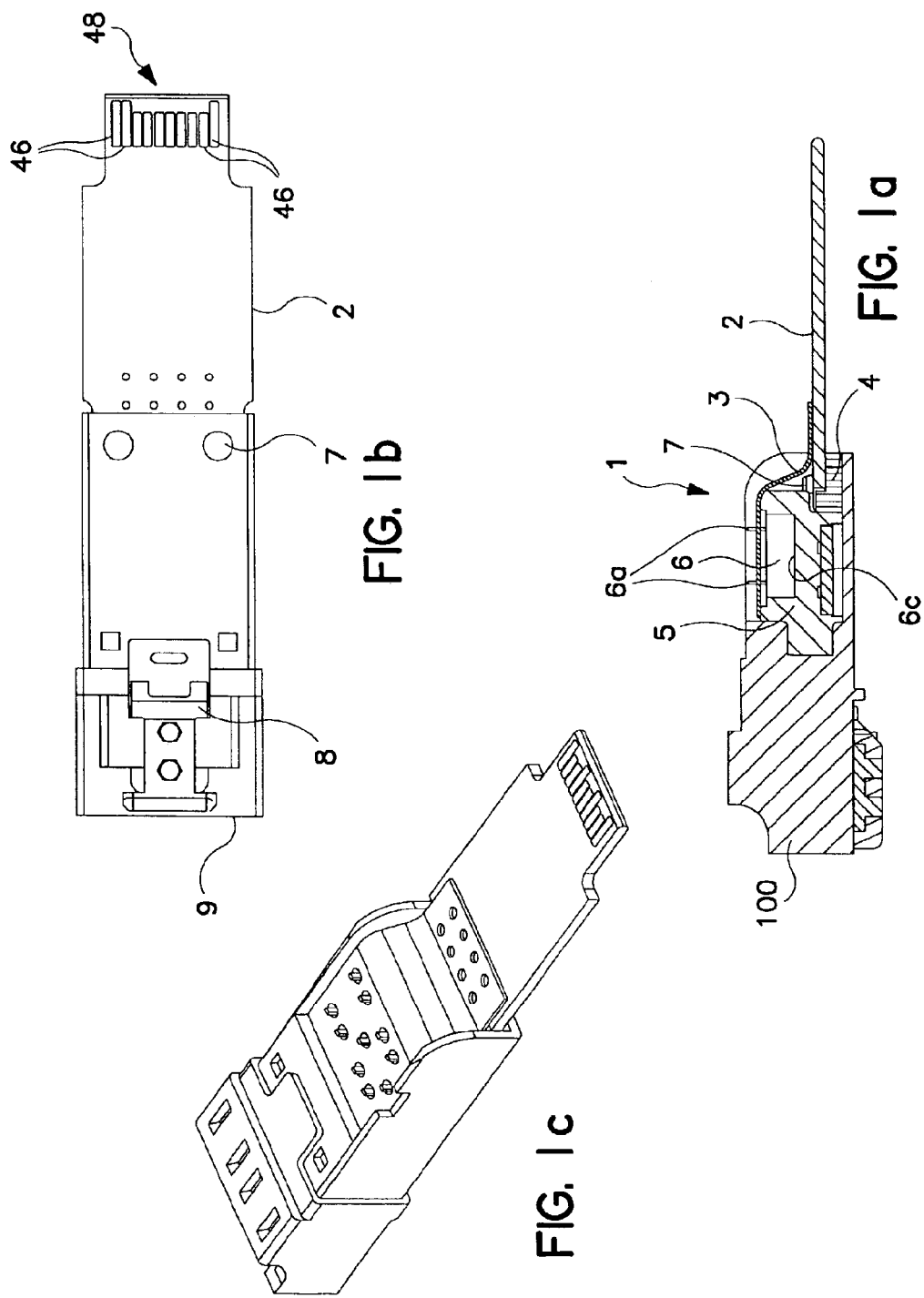

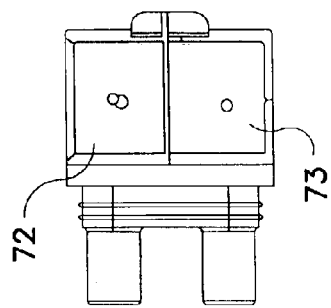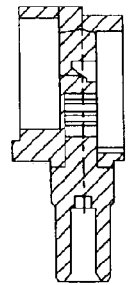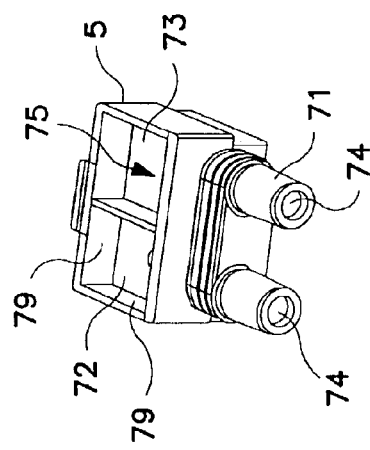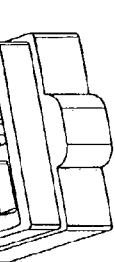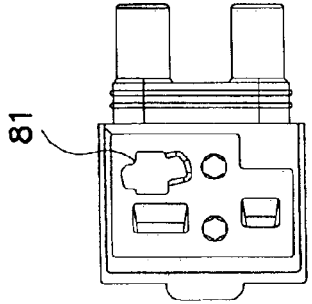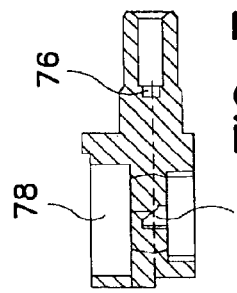

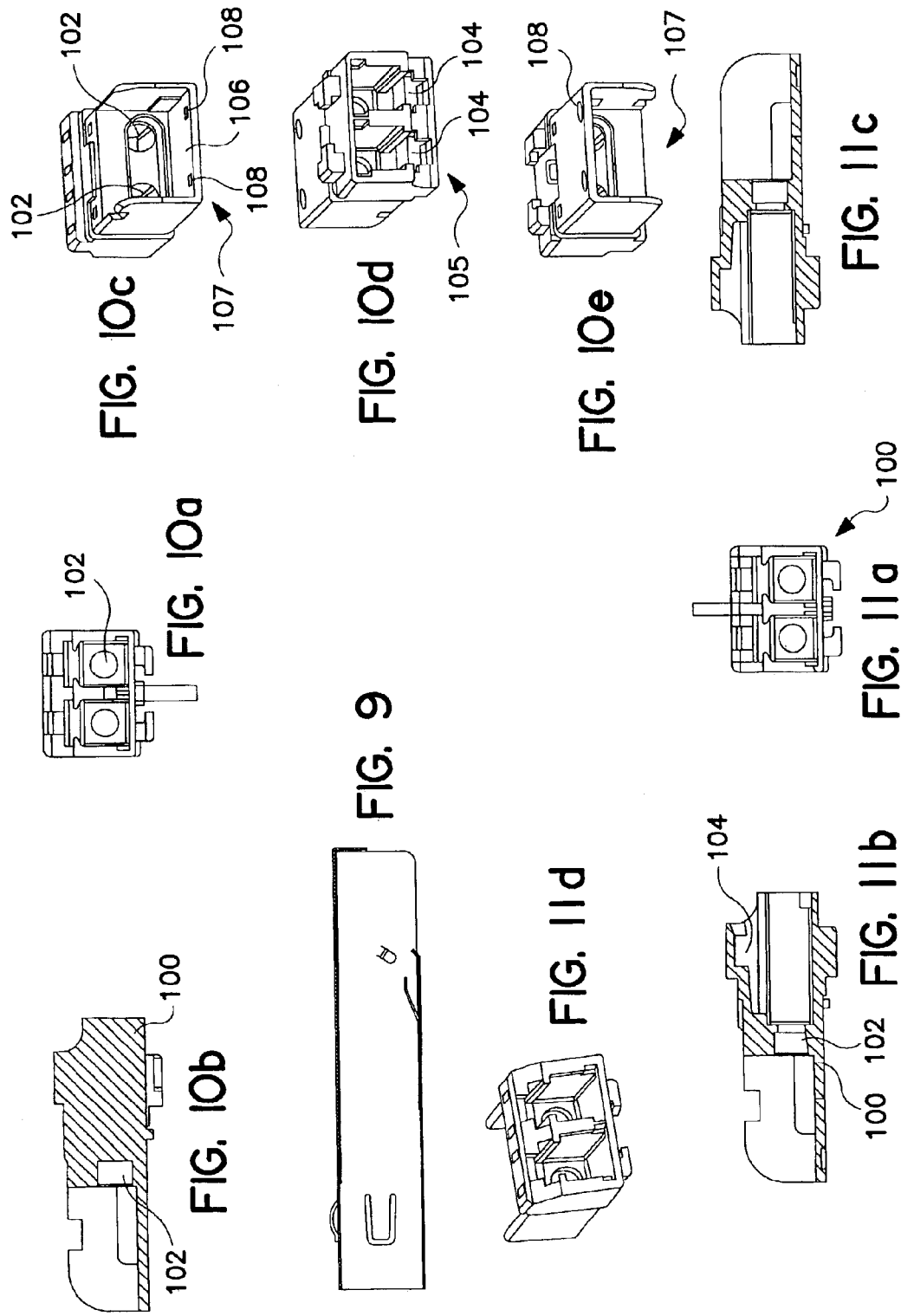

TRANSCEIVER FOR LC CONNECTOR

REFERENCE TO RELATED APPLICATION

The priority claim of this application is based on Provisional Application No. 60/259,141, filed Dec. 27, 2000, and incorporated herein by reference.

FIELD OF INVENTION

The present invention is related generally to opto-electric devices. More specifically, the present invention relates to transceiver devices for use with an LC-type connector.

BACKGROUND OF THE INVENTION

An important subsystem of an optical telecommunication system is the opto-electric interface which converts signals between the optical domain and the electrical domain. Typically, the opto-electric interface comprises some kind of opto-electric device (OED) for either transmitting or receiving optical signals. OEDs are commonly packaged in "TO can" assemblies which comprise a cap and a header assembly. The header assembly can be a hybrid microelectronic assembly which includes the OED plus one or more integrated circuits (ICs) or passive components.

In addition to the OED, a typical opto-electric interface comprises a printed circuit board or substrate containing the necessary circuitry to operate the OED, and a connector interface for interfacing with an optical connector of an optical fiber or cable. A typical optical connector comprises a housing with a ferrule disposed therein. The ferrule is configured to hold one or more fibers in a specific spacial relationship and has an end face which presents the fiber end(s). The end face is generally polished to provide for good optical contact with a mating face of the module. The combination of the fiber and optical connector is referred to herein as a "cable assembly".

Generally, the OED, supporting circuitry, substrate and connector interface are packaged into a discrete module, referred to herein as an "opto-electric module" or just "module." Opto-electric modules are generally configured for installation into larger host systems such as routers and computers. The modules are typically installed on host circuit boards within such host systems using conventional installation configurations such as through-pin mounting or pluggable receptacles. Since the modules are configured to interconnect to cable assemblies, the modules are typically positioned near the perimeter of the host system for accessibility and to avoid the need for circuitously routing the fiber through the host system. The desire to minimize the access area required for each module has lead to modules being elongated and rectilinear in shape such that they present an end face having a relatively small area for connection to the cable assembly.

Optoelectric modules tend to be expensive and there exists a need to reduce costs associated therewith. One way to reduce costs is to reduce waste during manufacture of the modules. Waste can be reduced by determining as early as possible in the manufacturing process whether the optical subassembly containing the OED is functioning properly. Early detection of a defective subassembly of the module can save costs that would have been incurred to complete the module, e.g. costs of additional assembly time and/or additional components. These costs are unnecessary if the OED component is defective and are avoidable if the defective nature of the OED is detected early.

For various reasons, prior art optoelectric modules are not compatible with early defect detection procedures. Specifically, prior art modules tend to require the assembly of numerous, difficult-to-assemble components to obtain a testable subassembly. For example, before testing of a prior art module can occur, typically the following components need to be assembled: an adapter for a connector, an OED, components for optically linking a connector to the OED, and control circuitry for the OED. Typically, these components represent the most expensive components of the module and require the most time and care to assemble. For example, the TO cans typically used in prior art modules are incompatible with most automated pick-and-place assembly operations and they lack reference surfaces to facilitate passive alignment. Therefore, TO cans must be handled manually and actively aligned by hand which is expensive and does not lend itself to high volume production. Therefore, TO cans increase the cost of the testable subassembly.

There is a need for an optoelectonic module having an optical subassembly that is readily testable before making a considerable investment of time and materials. The present invention fulfills this need among others.

SUMMARY OF INVENTION

The present invention provides for an optoelectric module that has an optical subassembly that facilitates testing of all of the critical optical alignments and OEDs early in the assembly process before a significant investment of assembly time and materials is made. More specifically, the optoelectric module of the present invention has an optical subassembly which defines the optical path from a fiber in a ferrule to an OED in a unitary, integrally-molded optical block. The integrally-molded optical block also comprises a ferrule-receiving bore at one end of the optical path for holding the ferrule such that the fiber is aligned with the optical path, and a OED-receiving cavity at the other end of the optical path for holding a lead frame such that the OED thereon is substantially aligned or readily alignable with the optical path. This way, a testable optical subassembly, in which all critical optical alignments are fixed, is formed early in the assembly process by simply combining the unitary, integrally-molded optical block with an OED. This has considerable advantages over the prior art designs which require the assembly of multiple components which are typically expensive and difficult to handle. Therefore, it is an advantage of the testable optical subassembly of the present invention that, if a faulty optical subassembly is detected, remedial action can be performed without extensive disassembly or subassembly can be scrapped with a minimum investment of time and materials.

One aspect of the present invention is an easily-assembled, testable optical subassembly for transmitting optical signals between a fiber held in a ferrule and an OED. In a preferred embodiment, the testable optical subassembly comprises a unitary structure of an optically-clear moldable material having at least the following features: (a) an optical path for transmitting optical signals between the fiber and the OED; (b) a ferrule-receiving bore for receiving the ferrule and aligning the fiber held therein to the optical path; and (c) an OED-receiving cavity for receiving a lead frame and aligning the OED mounted thereon to the optical path in one or more axes.

Another aspect of the present invention is an optoelectric module having the easily-assembled testable optical subassembly. In a preferred embodiment, the module comprises: (a) a connector interface adapted to interconnect with a fiber assembly having a ferrule with a fiber held therein; (b) an optical block comprising a unitary structure of an optically-clear moldable material having at least the following features: (i) an optical path for transmitting optical signals between the fiber and an OED; (ii) a ferrule-receiving bore for receiving the ferrule and aligning the fiber held therein to the optical path; and (iii) an OED-receiving cavity for receiving a lead frame and aligning an OED mounted thereon to the optical path in one or more axes; (c) the lead frame mounted in the OED-receiving cavity such that the OED is optically coupled to the optical path; and (d) a printed circuit board comprising a plurality of contacts for electrical connection to a host circuit board of a host system, a portion of the contacts being electrically coupled to the OED.

Yet aspect of the present invention is a host system containing the optoelectric module of the present invention.

Still another aspect of the present invention is a method of assembling the optoelectric module of the present invention by testing an optical subassembly early in the assembly process. In a preferred embodiment, the process comprises: (a) providing an optical block comprising a unitary structure of an optically-clear moldable material having at least the following features: (i) an optical path for transmitting optical signals between a fiber and an OED; (ii) a ferrule-receiving bore for receiving a ferrule containing a fiber and aligning the fiber to the optical path; and (iii) an OED-receiving cavity for receiving a lead frame with an OED mounted thereon and aligning the OED to the optical path in one or more axes; (b) mounting a lead frame in the OED-receiving cavity such that an OED mounted on the lead frame is optically coupled to the optical path, thereby forming a testable optical subassembly; (c) inserting a ferrule containing a fiber into the ferrule-receiving bore; and (d) testing the testable optical subassembly before substantially further assembling the optoelectric module.

BRIEF DESCRIPTION OF DRAWINGS

FIGS. 1a–c are cross-sectional, bottom and perspective views of a module in accordance with the present invention;

FIGS. 2b–c are cross-sectional and bottom views of the module of FIGS. 1a–c, shown fitted with the shield of FIG. 2a;

FIGS. 7a–d are perspective, top and cross-sectional views of an optical block of the module of FIGS. 1a–c;

FIGS. 8a–b are bottom and perspective views of the optical block of FIGS. 7a–d;

FIG. 9 is a cross-sectional view of the shield of FIG. 2a;

FIGS. 10a–e are front, cross-sectional and perspective end views of the module of FIGS. 1a–c; and FIGS. 11a–d are front, cross-sectional and perspective end views of the module of FIGS. 10a–e.

DETAILED DESCRIPTION OF PREFERRED EMBODIMENT

Figure 2C:
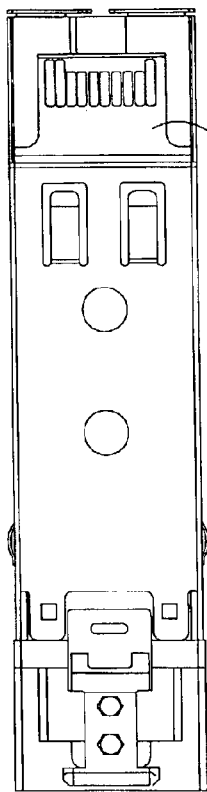
Figure 2B:
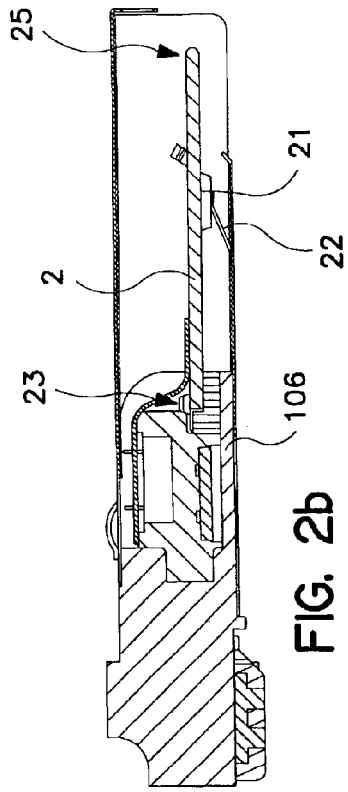
Figure 2A:
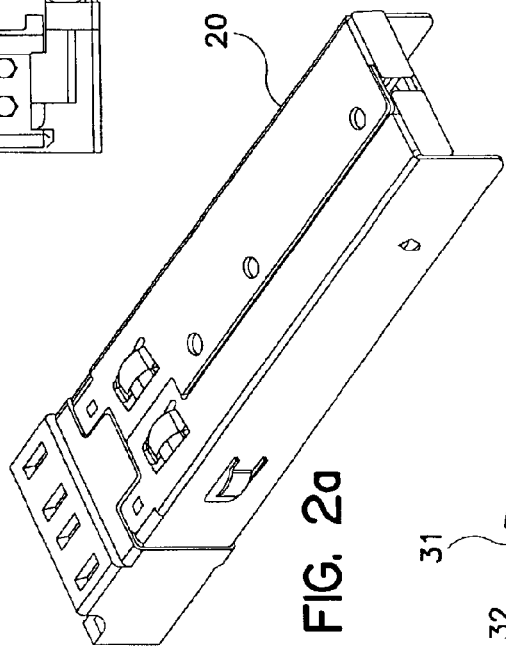
FIG. 2a is a perspective view of a shield for fitting with the module of FIGS. 1a–c.

FIGS. 1a–c are cross-sectional, bottom and perspective views of a module 1 in accordance with the present invention. The module 10 is configured to be mounted in a variety of host systems including for example, routers, computers, switches, bridges, and I/O cards. In general, the module may be used in any application requiring an interface between electrical and optical signals. As shown in FIG. 1a, the module 1 basically comprises a testable optical subassembly which in turn comprises an optical block 5 and opto-electric devices (OEDs) 6. The testable optical subassembly is combined with other components which are herein refereed to as post-test-assembly components and which include a printed circuit board 2 and a housing 20 (FIG. 2a). These components are addressed in greater detail below.

Testable Optical Subassembly

An important aspect of the present invention is the testable optical subassembly. The testable optical subassembly essentially involves only two components—namely, the optical block 5 and one or more OEDs 6.

As the term is used herein, OED refers to a device which converts electrical current to light and/or light to electrical current. The term "light" refers generally to electromagnetic radiation, and preferably to those wavelengths of electromagnetic radiation to which semi-conductive material is, or can be made, sensitive, whether or not such light is actually visible to the unaided eye. Examples of opto-electronic devices include lasers (e.g., vertical cavity surface emitting laser (VCSEL), double channel, planar buried heterostructure (DC-PBH), buried crescent (BC), distributed feedback (DFB), distributed bragg reflector (DBR), etc.), light emitting diodes (LEDs) (e.g. surface emitting LED (SLED), edge emitting LED (ELED), super luminescent diode (SLD), etc.) or photodiodes (e.g., P Intrinsic N (PIN), avalanche photodiode (APD), etc.). As is understood by those skilled in the art, optoelectronic devices typically include an "active area" or "active surface" which emits light or is sensitive to the impingement of light thereon. As the term is used herein, the "operative axis" of such devices refers to the axis which is about normal to and passes through about the center of such active area or active surface.

With respect to transmitters, preferably the OED comprises a laser chip having a VCSEL and a power monitor, namely, a photodetector. A VCSEL is preferred because it has relatively low cost, uses a surface emission approach which is optically simply, and is capable of being fabricated in larger volumes on semiconductor wafers. More preferably, the OED comprises a ridge VCSEL having formed as a part thereof a vertically integrated PIN photodetector, a vertically integrated MSM photodetector, a laterally integrated photodetector, a separate laterally positioned photodetector, a dual VCSEL and flip chip photodetector, or the like.

Preferably, the OED is manufactured using lead frame technology. It is advantageous that the lead frame structure allows for the simultaneous fabrication of a large number of optoelectronic packages, such as transmitters, receivers or transceivers. Similar to conventional electronic integrated circuit processing, a plurality of integrated circuits may be simultaneously attached and wire bonded to the lead frame. In accordance with the known manufacturing techniques, an associated plurality of optical devices are coupled to lead frames and the combination of electronics and optics encapsulated using a molding process (e.g., transfer molding) to form the final packaged assembly. When the molding operation is completed, lead frames may be severed from one another to form a plurality of final package assemblies.

The optical block 5 is a unitary structure of an optically-clear moldable material, such as an injection moldable material. The optical block defines an optical path from a fiber to an OED. Preferably, the optical path is formed by first and second lenses and a reflective surface. The optical block has a ferrule-receiving bore 74 for receiving a fiber-containing ferrule of an optical fiber connector, as shown in FIG. 7a. The mating of the ferrule with the ferrule-receiving bore 74 holds the ferrule and the fiber carried therein in optical alignment with an optical path. Preferably the ferrule carries a single fiber, although not necessarily.

As shown in FIGS. 7a–d and 8a–b, optical block 5 includes a first lens 76 which is aligned with the ferrule-receiving bore 74 such that, when a ferrule is in the ferrule-receiving bore, the first lens is optically coupled to with the fiber in the ferrule. The optical block 5 also includes a second lens 78 adapted to cooperate optically with an OED 6. The second lens 78 is optically coupled to said first lens 76 along an optical path. The optical block 5 also includes at least one reflective surface 77 disposed along the optical path to alter the direction of the optical path from the first lens 76 to the second lens 78. In this manner, light pulses carried along an optical fiber enter the optical block along ferrule-receiving bore 74, pass through the first lens 76, are reflected off the reflective surface 77 to the second lens 78 and onto light pulse sensitive areas of the OED 6.

Preferably, light bending is used along the optical paths to either change the direction of the light to make it normal to the circuit board and thus facilitate the use of lead frames which connect directly to the circuit board, or to increase spacing between optical paths to accommodate dimensions of the OED and/or to reduce crosstalk.

Referring now to FIGS. 1a, 7a–d and 8a–b, the optical block 5 has OED-receiving cavities 72, 73 configured for receiving an OED 6, such as a lead frame 6, and for holding the OED in optical alignment with an optical path. As shown in FIGS. 7a–d, each receptacle is a substantially rectangular cavity having a mating surface 75 and side walls 79 to provide rough alignment of the lead frame 6 as well as to provide a reservoir for potting the lead frame in place if desired. The receptacles 72, 73 are preferably dimensioned to hold the OED without the need for active alignment in one or more dimensions. Receptacles 72, 73 may be configured to receive interchangeable lead frames. In other words, preferably the interface between the optical block and the OED is standardized to receive either transmitters, receiver or other OEDs.

The receptacles may be configured with one or more reference or datum surfaces to provide for mechanical, passive alignment of the OED. In other words, rather than relying on active alignment to achieve the desired degree of alignment, certain mechanical stops can be used such that the OED is simply placed in the receptacle. For example, if the distance from the second lens (e.g., 78) and the mating surface 6c is controlled precisely and if OEDs, such as lead frames, are used in which the distance from the active surface of the laser (or detector) to the top surface of the OED (or some other reference surface) is controlled, then the top surface simply needs to be contacted with the mating surface 6c to achieve the proper alignment distance between second lens (e.g., 78) and the active surface of the OED.

In addition to establishing the distance between the active surface of the OEDs and the second lenses, the OED interfaces may be configured to optically align the second lenses with the operative axis of the OED. For example, if the OED is provided with a reference surface from its operative axis, such as side wall of lead frame 6, and the side wall 79 of the receptacle is closely toleranced as a reference point from the operative axis of the second lens 78, then contact between the side wall 79 and the reference surface would provide for mechanical passive alignment of the OED and second lens. Such alignment may be particularly preferred for OEDs with large active surfaces such as photo-diodes and LED transmitters. Some active alignment may be expected for transmitters where the emitted beam is relatively narrow. The OED-receiving cavity 72, 73 includes the second lens 78. The OED is mounted in the OED-receiving cavity 72, 73 of the optical block 5 and is optically coupled to the second lens 78.

The OED 6 and the optical block 5 of the module 1 make up a testable optical subassembly of the module 1. Once the OEDs are mounted in the receptacles 72, 73 of the optical block 5, all critical optical alignments are fixed. More specifically, the optical block is be precisely manufactured to ensure alignment of the ferrule-receiving bore 74 with the lenses and optical components creating the optical path to the OED 6. Alignment of the fiber is ensured by receiving the ferrule directly into the precisely manufactured ferrule-receiving bore of the optical block 5.

The optical subassembly can be tested before making a significant investment of assembly time and materials. If the optical subassembly is faulty, remedial action can be performed without the need for extensive disassembly or the optical subassembly can be discarded with only minimal waste of time and materials. Specifically, early testing of the testable optical subassembly avoids wasting the post-test-assembly components, which include, for example, the connector interface 100, printed circuit board 2, flat flexible circuit 3, pin 7, and spacer 4.

Post-Test-Assembly Components

The connector interface 100 is adapted to interconnect with a connector of a fiber assembly (not shown)and is shown in detail in FIGS. 10a–e and 11a–d. The connector interface 100 is configured to interengage with a fiber optic connector housing a ferrule in which one or more fibers are held in precise alignment relative to the external surface of the ferrule. In a preferred embodiment, the connector interface 100 is configured to mate with an LC connector distributed by, for example, Lucent Technologies, Inc. of Murray Hill, N.J., U.S.A. As shown in FIGS. 10a and 10d, a front side 105 of the connector interface 100 has a latching portion 104 configured for interfacing with a connector of an optical fiber (or two connectors as shown in FIGS. 10 and 11), e.g., for mechanically latching a cable carrying the fiber to the module 1. The connector interface 100 includes a through-bore 102 for allowing a ferrule of each fiber/cable to pass through the connector interface 100. A rear side 107 of the connector interface 100 is shown in FIGS. 10c and 10e. The rear side of the connector interface 100 has a flange 106 defining through-bores 108 for attachment to a printed circuit board (not shown in FIGS. 10 and 11).

Figure 6A:
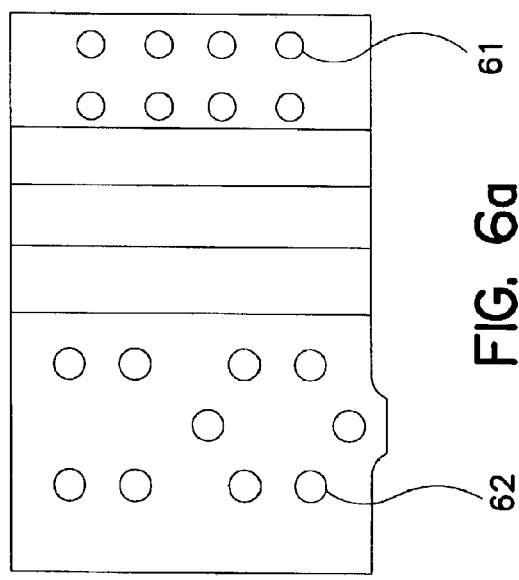
FIGS. 6a–b are top and cross-sectional views of a flat flexible circuit of the module of FIGS. 1a–c.
Figure 6B:
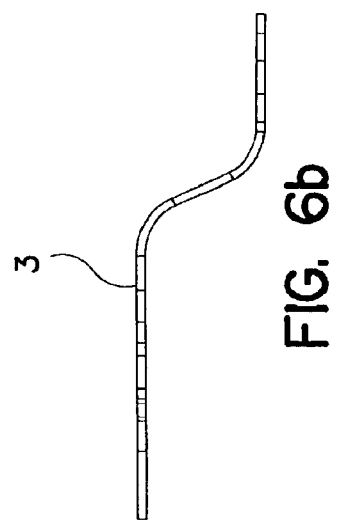

Electrical signals from the OED 6 are carried from output pins 6a of the OED 6 to a flat flexible circuit ("FFC") 3, as shown in FIGS. 1a, 6a and 6b. The FFC carries the electrical signals to appropriate traces of a printed circuit board 2 of the module 1. As the term is used herein, "printed circuit board" refers to an electronic component having electronic circuit elements mounted thereto or forming part thereof. The substrate may include, for example, a plurality of integrated chips. Such chips may represent, for example, a pre-amplifier or post-amplifier and additional electronic circuits. The type and nature of such circuit elements, and the techniques and methods for mounting such elements to the substrate are well known in the art and do not form part of the present invention. In the embodiment shown in FIG. 2b, the printed circuit board 2 has an integrated circuit 21 mounted thereon. In typical embodiments, the printed circuit board comprises a flat, flexible circuit board (FFC), a conventional printed circuit board (PCB), a printed wiring board (PWB) and/or similar substrates well known in the art. Since the space in modules is limited and the space within a module for a printed circuit board even more limited, printed circuit boards tend to be crowded and consequently space saving measuring in board are generally undertaken.

Figure 3:
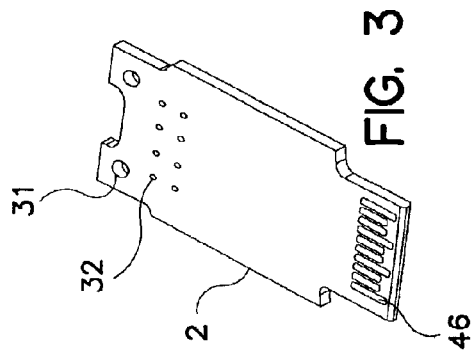
FIG. 3 is a perspective view of a printed circuit board of the module of FIGS. 1a–c.

As shown in FIGS. 1b and 3, the printed circuit board 2 has a plurality of contacts 46 arranged adjacent an edge 48 for mating with a card edge connector (not shown) of a host printed circuit board, as shown in FIG. 1b. This makes the module pluggable, i.e., insertable to form electrical connections, into a socket mounted on a host printed circuit board. Traces of the printed circuit board 2 and FFC 3 electrically couple the contacts 46 with the OED 6.

In an alternate embodiment, the printed circuit board 2 is not pluggable, but rather has compliant pins depending therefrom for forming solderless connections with another substrate (not shown) of the host system. Alternatively, the printed circuit board may have through holes and/or pins for forming soldered connections. In addition to pins, through holes and edge contacts, any other known means for interfacing the substrate with the host system may be used within the scope of the present invention.

Figure 4:
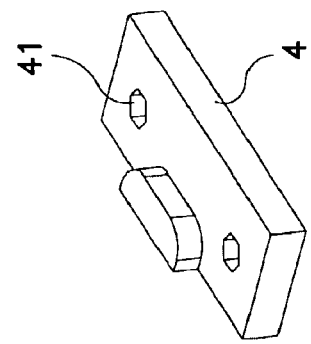
FIG. 4 is a perspective view of a spacer of the module of FIGS. 1a–c.
Figure 5:
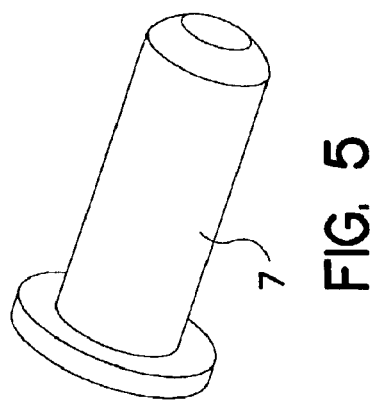
FIG. 5 is a perspective view of a pin for mounting the printed circuit board of FIG. 3 and the spacer of FIG. 4 to the module of FIGS. 1a–c.

The printed circuit board 2 is mounted to the connector interface 100, as shown in FIG. 1a. In the embodiment shown in FIG. 2b, a proximal end 23 of the printed circuit board 2 is attached to the flange 106 of the connector interface by pin staking, i.e., by inserting a pin 7, as shown in FIG. 5, through an opening 31 of the printed circuit board 2 and into an opening 108 of the connector 100, as shown in FIGS. 2b and 10c. The proximal end 23 is preferably separated from the connector interface 100 by a spacer 4 as shown in FIGS. 1a and 4. In such an embodiment, the pins 7 pass through openings 41 of the spacer 4.

It is advantageous for the module 1 to include a conductive shield 20 as shown in FIGS. 2a and 9. The conductive shield 20 is mounted to the connector interface 100 and at least partially encloses the printed circuit board 2 as shown in FIGS. 2a and 2b. The conductive shield 20 includes a resilient standoff 22 extending out of a plane defined by a portion of the conductive shield and into contact with the printed circuit board 2. In this manner, the resilient standoff 22 is capable of supporting a distal end 25 of the printed circuit board 2. Preferably, the resilient standoff 22 is positioned to contact the integrated circuit 21 mounted on the printed circuit board 2 so as not to contact any conductive portions of the printed circuit board 2. This way, no space must be left unused on the printed circuit board 2 to provide a landing for a support structure.

What is claimed is:

1. A testable optical subassembly for use in an optoelectric module to transmit optical signals between a fiber held in a ferrule and an OED, said optical subassembly comprising a unitary structure of an optically-clear moldable material having at least the following features:

an optical path for transmitting optical signals between said fiber and said OED;

a ferrule-receiving bore for receiving said ferrule and aligning said fiber held therein to said optical path; and an OED-receiving cavity for receiving a lead frame and aligning said OED mounted thereon to said optical path in one or more axes.

2. The testable optical subassembly of claim 1, wherein said optical path comprises at least:

a first lens adapted for optically coupling with said fiber;

a second lens adapted for optically coupling with said OED; and at least one reflective surface disposed along said optical path to alter the direction of said optical path.

3. The testable optical subassembly of claim 1, further comprising:

said lead frame mounted in said OED-receiving cavity such that said OED is optically coupled to said optical path.

4. The testable optical subassembly of claim 1, wherein said optical block comprises an injection-moldable material.

5. The testable optical subassembly of claim 1, wherein said OED-receiving cavity is standardized to a particular lead frame configuration, said lead frame configuration being adapted to support lasers, LEDs, photodiodes or detectors.

6. An optoelectric module comprising:

a connector interface adapted to interconnect with a fiber assembly having a ferrule with a fiber held therein;

an optical block comprising a unitary structure of an optically-clear moldable material having at least the following features:

an optical path for transmitting optical signals between said fiber and an OED;

a ferrule-receiving bore for receiving said ferrule and aligning said fiber held therein to said optical path; and an OED-receiving cavity for receiving a lead frame and aligning an OED mounted thereon to said optical path in one or more axes;

said lead frame mounted in said OED-receiving cavity such that said OED is optically coupled to said optical path; and a printed circuit board comprising a plurality of contacts adapted for electrical connection with a host circuit board of a host system, a portion of said contacts being electrically coupled to said OED.

7. The module of claim 6, wherein said contacts are arranged adjacent an edge of said printed circuit board for mating with a card edge connector mounted to said host circuit board.

8. The module of claim 6, wherein said portion of contacts are electrically coupled to said OED by traces on a flat, flexible circuit board.

9. The module of claim 6, wherein said printed circuit board is pin staked to said connector interface.

10. The module of claim 6, further comprising a conductive shield mounted to said connector interface, said conductive shield at least partially enclosing said printed circuit board.

11. The module of claim 6, wherein said printed circuit board is pin staked to said connector interface at a proximal end of said printed circuit board and wherein said conductive shield comprises a resilient standoff extending out of a plane defined by a portion of said conductive shield and into contact with said printed circuit board for supporting a distal end of said printed circuit board, wherein said resilient standoff is positioned to contact an integrated circuit chip mounted on said printed circuit board.

12. The module of claim 6, wherein said printed circuit board is pin staked to said connector interface at a proximal end of said printed circuit board and wherein said proximal end is separated from said connector interface by a printed circuit board spacer.

13. The module of claim 6, wherein said optical path comprises at least:

a first lens adapted for optically coupling with said fiber;

a second lens adapted for optically coupling with said OED; and at least one reflective surface disposed along said optical path to alter the direction of said optical path.

14. A process of manufacturing an optoelectric module comprising the steps of:

(a) providing an optical block comprising a unitary structure of an optically-clear moldable material having at least the following features:

an optical path for transmitting optical signals between a fiber and an OED;

a ferrule-receiving bore for receiving a ferrule containing a fiber and aligning the fiber to said optical path; and an OED-receiving cavity for receiving a lead frame with an OED mounted thereon and aligning the OED to said optical path in one or more axes;

(b) mounting a lead frame in said OED-receiving cavity such that an OED mounted on said lead frame is optically coupled to said optical path, thereby forming a testable optical subassembly;

(c) inserting a ferrule containing a fiber into said ferrule-receiving bore; and (d) testing said testable optical subassembly before substantially further assembling said optoelectric module.

15. The process of claim 14, wherein testing is conducted while actively aligning said OED.

16. The process of claim 14, wherein testing is conducted after said OED is fixed in place within said OED-receiving cavity.

* * * * *